(12) United States Patent
Hecker et al.

(10) Patent No.: US 12,515,634 B2
(45) Date of Patent: Jan. 6, 2026

(54) BRAKE SYSTEM FOR A UTILITY VEHICLE, UTILITY VEHICLE, AND METHOD FOR OPERATING THE BRAKE SYSTEM

(71) Applicant: Knorr-Bremse Systeme Fuer Nutzfahrzeuge GmbH, Munich (DE)

(72) Inventors: Falk Hecker, Markgroeningen (DE); Oliver Jundt, Hessigheim (DE); Friedbert Roether, Cleebronn (DE); Max Michalski, Neubiberg (DE); Thomas Weinhold, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 788 days.

(21) Appl. No.: 17/839,632

(22) Filed: Jun. 14, 2022

(65) Prior Publication Data

US 2022/0402471 A1 Dec. 22, 2022

(30) Foreign Application Priority Data

Jun. 17, 2021 (DE) ...................... 10 2021 115 711.0

(51) Int. Cl.
*B60T 15/02* (2006.01)
*B60T 8/17* (2006.01)
(Continued)

(52) U.S. Cl.
CPC .............. *B60T 15/027* (2013.01); *B60T 8/34* (2013.01); *B60T 8/94* (2013.01); *B60T 8/1701* (2013.01)

(58) Field of Classification Search
CPC ... B60T 7/20; B60T 7/042; B60T 8/34; B60T 8/94; B60T 8/248; B60T 8/323
(Continued)

(56) References Cited

U.S. PATENT DOCUMENTS 6,007,159 A * 12/1999 Davis ...................... B60R 25/08
303/89
2010/0078988 A1* 4/2010 Bensch ................. B60T 13/588
303/3
(Continued)

FOREIGN PATENT DOCUMENTS

CN 103754211 A * 4/2014
CN 103770770 A * 5/2014
(Continued)

OTHER PUBLICATIONS

English machined translation of CN—103770770 A, May 7, 2014.*
English machined translation of CN—103754211 A, Apr. 30, 2014.*

*Primary Examiner* — Robert A. Siconolfi
*Assistant Examiner* — San M Aung
(74) *Attorney, Agent, or Firm* — NORTON ROSE FULBRIGHT US LLP (57) ABSTRACT

A brake system for a utility vehicle includes: an electronic brake controller unit, a pneumatic parking brake circuit with at least one spring energy cylinder, a parking brake valve to control a parking brake pressure in the parking brake circuit, and at least one 3/3-way valve arranged in a pneumatic line of the parking brake circuit between the parking brake valve and at least one of the spring energy cylinders. The 3/3-way valve is actuable by the electronic brake control unit, and is configured to ventilate the pneumatic line between the 3/3-way valve and at least one of the spring energy cylinders to a predefined pressure, so as to cause the at least one of the spring energy cylinders to allow a brake, which is assigned to the spring energy cylinder, to pass into engagement.

21 Claims, 4 Drawing Sheets

(51) Int. Cl.
*B60T 8/34* (2006.01)
*B60T 8/94* (2006.01)

(58) Field of Classification Search
USPC .............................................................. 188/7
See application file for complete search history.

(56) References Cited

U.S. PATENT DOCUMENTS

| | | |
|---|---|---|
| 2014/0054118 A1 | 2/2014 | Rogers et al. |
| 2016/0201746 A1* | 7/2016 | Zeiler ................... B60T 13/268 |
| | | 188/106 P |
| 2018/0273014 A1* | 9/2018 | Boulivan .............. B60T 8/1701 |
| 2019/0241164 A1* | 8/2019 | Nemeth ................. B60T 8/323 |
| 2019/0248349 A1* | 8/2019 | Wulf .................. B60W 10/184 |
| 2020/0070795 A1* | 3/2020 | Van Thiel ............. B60T 13/662 |
| 2021/0086738 A1* | 3/2021 | Schwoerer ............. B60T 17/04 |

FOREIGN PATENT DOCUMENTS

| | | |
|---|---|---|
| CN | 105905087 A | 8/2016 |
| DE | 102013107503 A1 | 1/2015 |
| DE | 102019103901 A1 | 8/2020 |

* cited by examiner

BRAKE SYSTEM FOR A UTILITY VEHICLE, UTILITY VEHICLE, AND METHOD FOR OPERATING THE BRAKE SYSTEM

RELATED APPLICATION INFORMATION

The present application claims priority to and the benefit of German patent application no. 10 2021 115 711.0, which was filed in Germany on Jun. 17, 2021, the disclosure of which is incorporated herein by reference.

FIELD OF THE INVENTION

The invention relates to a brake system for a utility vehicle, to a utility vehicle, and to a method for operating the brake system, in particular for electronic brake systems.

BACKGROUND INFORMATION

In order to make braking of a vehicle possible in the case of a failure of components of a brake system, there are various service brake redundancy concepts. Here, the redundancy is realized mainly on an actuation level with the aid of magnetron components.

In current systems which conform with ECE R13, the backup circuits are pneumatically of a dual-circuit configuration, and still have to achieve a secondary braking performance in the region of 2-2.6 m/s$^2$ in the case of a failure of one pneumatic circuit. Failures of this type can be caused, for example, by a defect of a supply line of the pneumatic circuit, for instance to a pressure vessel or an electropneumatic module, a defective pressure vessel, a defective compressed air line between the electropneumatic module and a brake cylinder, or a defective diaphragm in the brake cylinder. A multiple-circuit protective valve is usually provided for safety reasons, with the result that a certain securing pressure, by which the legally required secondary braking performance can be achieved, remains in intact circuits although the pressure is lost in the defective circuit.

In driverless, highly automated vehicles, with an SAE automation level IV or higher, as high a retardation as possible of, for example, 4 m/s$^2$ is to be achieved, however, even in the case of a failure of a supply circuit. This cannot always be achieved, however, with only one intact pneumatic circuit. One option would therefore be to provide a further pneumatic circuit as additional fallback level. This means a corresponding additional expense with high additional costs, however, inter alia for the installation and pipework of the brake system.

SUMMARY OF THE INVENTION

The invention is based on the object of providing a brake system, a utility vehicle and a method for operating the brake system which eliminates the above disadvantages. The invention provides a brake system, a utility vehicle and a method which inexpensively ensures safe operation during braking even of a driverless, highly automated vehicle with a correspondingly high retardation, even in the case of a pneumatic circuit failure.

The object may be achieved by a brake system as described herein, a utility vehicle as described herein, and a method as described herein. Advantageous developments are contained in the further descriptions herein.

In accordance with one aspect of the invention, a brake system for a utility vehicle has an electronic brake controller unit, a pneumatic parking brake circuit with at least one spring energy cylinder and a parking brake valve which is configured to control a parking brake pressure in the parking brake circuit, and at least one 3/3-way valve which is arranged in a pneumatic line of the parking brake circuit between the parking brake valve or a parking brake relay valve, which is connected in between, and at least one of the spring energy cylinders. The 3/3-way valve can be actuated by the electronic brake controller unit, and is configured to ventilate the pneumatic line between the 3/3-way valve and the at least one of the spring energy cylinders to a predefined pressure, in order to cause the at least one of the spring energy cylinders to allow a brake which is assigned to the spring energy cylinder to pass into engagement.

This brake system makes it possible that a parking brake circuit which is present in any case is utilized to assist a service brake of the utility vehicle in the case of a failure of a pneumatic brake circuit, in a manner which is actuated by the electronic brake controller unit, with the result that a provision of an additional pneumatic backup circuit is not required.

In one advantageous refinement of the brake system, the 3/3-way valve is configured as a pressure control valve, it being possible for the predefined pressure to be reduced not only to a fixedly set pressure, for example an ambient pressure, but rather to be regulated to and held at another suitable pressure in the case of corresponding boundary conditions.

In one advantageous refinement of the brake system, the 3/3-way valve is formed from two 2/2-way valves.

In the case of a further advantageous refinement of the brake system, the 3/3-way valve is configured to be actuable by the electronic brake controller unit in such a way that it acts as an ABS valve.

By a 3/3-way valve of this type, that function of the brake system which is made possible in normal operation by an ABS system which is integrated into the brake system can be maintained even in an emergency situation, as in the case of the failure of a service brake circuit.

In one advantageous refinement of the brake system, it has at least one service brake circuit with in each case at least one service brake cylinder, one of the at least one service brake cylinders being configured to allow the brake which is assigned to the spring force accumulator to pass into engagement.

It is made possible here, in the case of a failure of a service brake circuit, for the brake which is provided with a spring energy cylinder for a parking brake to be actuated by the parking brake circuit, without additional pneumatic installation complexity being required.

In the case of a further advantageous refinement of the brake system, the service brake cylinder and the spring energy cylinder are configured integrally as a combination brake cylinder.

By the combination brake cylinder, the associated brake can pass into engagement both via an actuation by the service brake circuit and also by the actuation by the parking brake circuit, with the result that installation space and costs can be saved.

In one advantageous refinement of the brake system, the parking brake circuit has two spring energy cylinders and a single 3/3-way valve, the brake system has at least two service brake circuits, one of the service brake circuits has two service brake cylinders, the two service brake cylinders are configured to allow the brakes which are assigned to the two spring energy cylinders to pass into engagement, the 3/3-way valve is arranged in the pneumatic line between the parking brake valve and the two spring energy cylinders, and the 3/3-way valve is configured to cause the two spring energy cylinders to allow the brakes which are assigned to the two spring energy cylinders to pass into engagement.

It is made possible here, in the case of a failure of a service brake circuit which acts, for example, on a rear axle which is provided with spring energy cylinders for a parking brake, to replace this failure of the braking performance of the service brake at the rear axle by the parking brake circuit, without additional pneumatic installation complexity being required.

As a result of another advantageous refinement of the brake system, the parking brake circuit has two spring energy cylinders and two 3/3-way valves, the two 3/3-way valves are arranged in the pneumatic line between the parking brake valve and in each case one of the spring energy cylinders, the brake system has at least two service brake circuits, one of the service brake circuits has two service brake cylinders, the two service brake cylinders are configured to allow the brakes which are assigned to the two spring energy cylinders to pass into engagement, and the two 3/3-way valves are configured to cause the two spring energy cylinders in each case to allow the brake which is assigned to the spring energy cylinders to pass into engagement individually and independently of one another.

As a result of this refinement, it is possible for the brakes of a brake circuit to be actuated differently even in an emergency, with the result that, in particular in the case of the provision of an ABS controller, safe operation without blocking of the wheels is still possible.

In another advantageous refinement of the brake system, the parking brake circuit has four spring energy cylinders and four 3/3-way valves, the four 3/3-way valves are arranged in the pneumatic line between the parking brake valve and in each case one of the spring energy cylinders, the brake system has at least two service brake circuits, two of the service brake circuits have in each case two service brake cylinders, the two service brake cylinders are configured to allow the brakes which are assigned to the four spring energy cylinders to pass into engagement, and the four 3/3-way valves are configured to cause the four spring energy cylinders in each case to allow the brake which is assigned to the respective spring energy cylinder to pass into engagement individually and independently of one another.

This refinement improves the safety, since, in the case of the failure of the service brake circuits, a plurality of brakes can still be actuated individually and independently of one another, by the 3/3-way valve.

In the case of a further advantageous refinement of the brake system, it has a trailer control valve which is configured to actuate pneumatic brakes of a trailer of the utility vehicle, and a further 3/3-way valve which is arranged in a pneumatic line between a parking brake actuating element and the trailer control valve. The further 3/3-way valve can be actuated by the electronic brake controller units, and is configured to ventilate the pneumatic line between the 3/3-way valve and the trailer control valve to a predefined pressure.

As a result of this configuration, there is also the possibility for the brakes of the trailer to be caused to brake in the case of a failure of its brake circuit, without increased pneumatic installation complexity.

In one advantageous refinement of the brake system, the further 3/3-way valve is configured as a further pressure control valve, it being possible for the predefined pressure to be reduced not only to fixedly set pressure, for example an ambient pressure, but rather to be regulated to a suitable pressure in the case of corresponding boundary conditions.

In the case of a further advantageous refinement of the brake system, the further brake control valve is configured to be actuable by the electronic brake controller unit in such a way that it acts as an ABS valve.

As a result of a further brake control valve of this type, that function of the brake system which is made possible in normal operation by an ABS system which is integrated into the brake system can be maintained even in an emergency situation, as in the case of the failure of the service brake circuit of the trailer.

In a further advantageous refinement of the brake system, the brake system has an air preparation unit and/or an electric parking brake and/or a further controller unit, and control elements of the electronic brake controller unit for the 3/3-way valve are integrated into a controller unit of the air preparation unit and/or the electric parking brake and/or into the further controller unit.

As a result of this configuration, even less expensive provision of the safety functions is possible.

In accordance with a further aspect of the invention, a utility vehicle has a brake system of this type.

In accordance with yet a further aspect of the invention, a method for operating the brake system is provided, with the steps: releasing of the brake which is assigned to the spring energy cylinder by actuation of the parking brake valve and increasing of the pressure in the parking brake circuit, detecting of a failure of a function of a service brake circuit by the electronic brake controller unit, and actuating of the at least one 3/3-way valve in order to ventilate the pneumatic line between the at least one 3/3-way valve and the spring energy cylinder to a predefined pressure, in order to allow the brake which is assigned to the spring force accumulator to pass into engagement.

This method makes it possible that a parking brake circuit which is present in any case is utilized to assist a service brake of the utility vehicle in the case of a failure of the service brake circuit, in a manner which is actuated by the electronic brake controller unit.

In one advantageous refinement of the method, it contains the steps: detecting of blocking of a wheel of the utility vehicle, and setting of the predefined pressure in the pneumatic line between the 3/3-way valve and the spring energy cylinder, with the result that blocking of the wheel is no longer detected.

As a result of these steps, the function which is made possible by the ABS system in normal operation of the brake system can be maintained even in an emergency situation, as in the case of the failure of a service brake circuit.

In the case of a further advantageous refinement of the method, it contains the additional step: actuating of the at least one 3/3-way valve, and ventilating of the pneumatic line between the at least one 3/3-way valve and the trailer control valve to a predefined pressure, in order to allow that brake of the trailer which is assigned to a trailer spring energy cylinder to pass into engagement.

As a result of this method, there is also the possibility for the trailer to be caused to break in the case of a failure of its service brake circuit, without increased pneumatic installation complexity.

In the following text, the invention will be explained on the basis of exemplary embodiments with reference to the appended figures.

DETAILED DESCRIPTION

Figure 1:
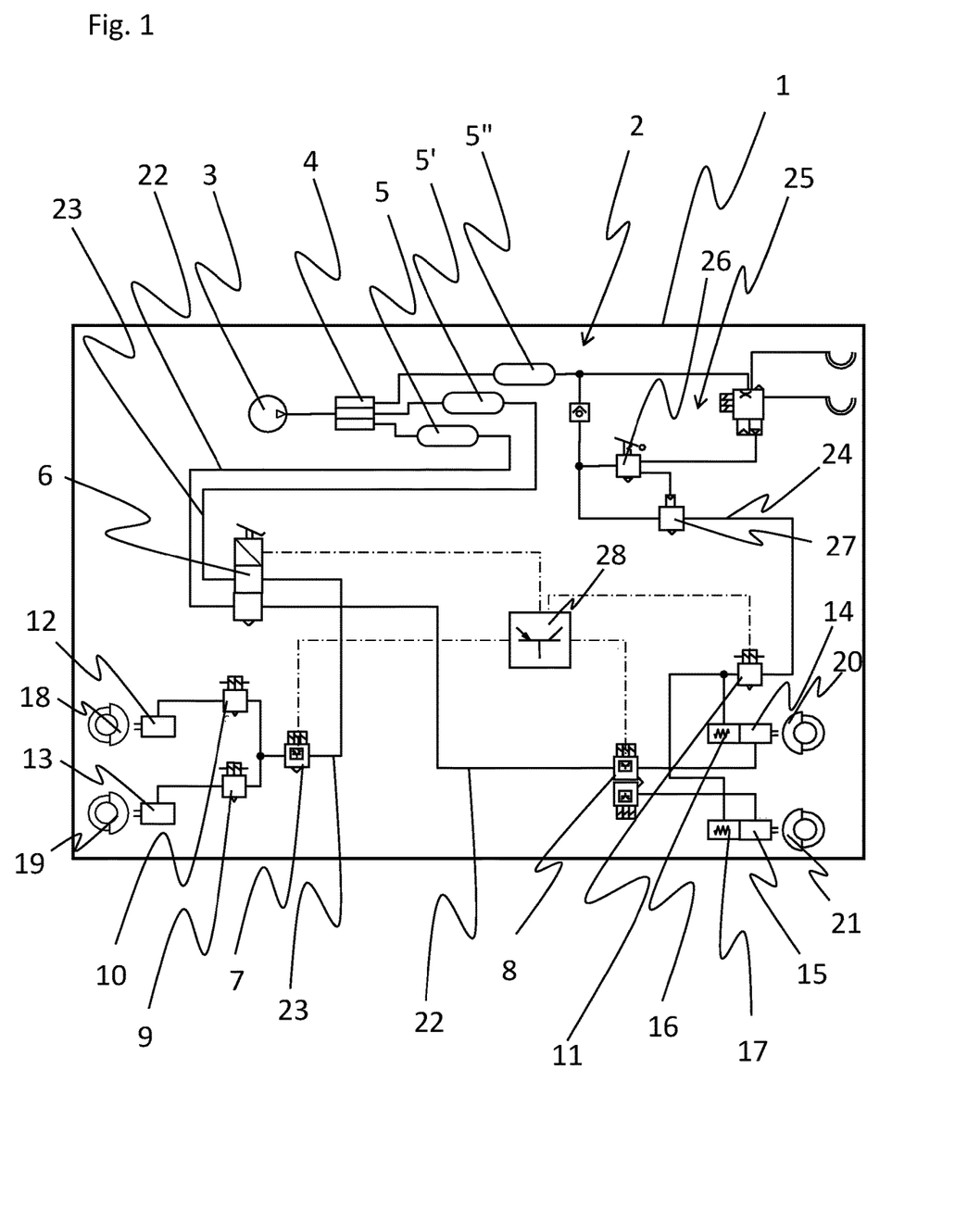
FIG. 1 shows an outline of a utility vehicle with a brake system in accordance with a first embodiment.

FIG. 1 shows an outline of a utility vehicle 1 with a brake system 2 in accordance with a first embodiment of the invention.

The brake system 2 has a compressor 3, an air preparation unit 4 and a plurality of pressure vessels 5, 5', 5". Furthermore, the brake system 2 has a foot brake module 6 and pressure regulating modules 7, 8. Moreover, the brake system 2 has what are known as 3/3-way valves 9, 10, 11, service brake cylinders 12, 13, 14, 15 and spring energy cylinders 16, 17 which are in each case assigned a brake 18, 19, 20, 21. The spring energy cylinders 16, 17 are in each case of integral construction with the service brake cylinders 14, 15 as what are known as combined brake cylinders. As an alternative, separate components can also be provided.

The compressor 3 provides compressed air at a suitable pressure, which compressed air is prepared (that is to say, filtered and dehumidified) in the air preparation device 4. The compressed air is then conveyed into the pressure vessels 5, 5', 5", in order in each case to form a compressed air reservoir there. The pressure vessel 5 is contained in a first pneumatic service brake circuit 22, and the pressure vessel 5' is contained in a second pneumatic service brake circuit 23. The pressure vessel 5" forms the compressed air reservoir both for a pneumatic parking brake circuit 24 and for a pneumatic trailer brake circuit 25. In alternative embodiments, the first pneumatic service brake circuit 22 and the second pneumatic service brake circuit 23 are not provided, but rather at least one service brake circuit or more than two service brake circuits which can also be of redundant configuration. Furthermore, the trailer brake circuit 25 is not provided in one alternative embodiment.

A parking brake actuating element as a parking brake valve 26 and a parking brake relay valve 27 are provided in the pneumatic parking brake circuit 24. For a braking function of the parking brake, the parking brake relay valve 27 which is actuated by the parking brake valve 26 controls the parking brake pressure in such a way that a pneumatic line between the parking brake relay valve 27 and the spring energy cylinders 16, 17 is pressureless or only a low parking brake pressure is contained. The spring energy cylinders 16, 17 have a function which is such that, in the case of a pressureless actuation, they exert a force on the respective associated brakes 20, 21, in order to brake the utility vehicle 1. If there is a parking brake pressure which is controlled by the parking brake relay valve 27 via the parking brake actuating element 26 and is sufficiently increased above a threshold value in the pneumatic line between the parking brake relay valve 27 and the spring energy cylinders 16, 17, the spring energy cylinders 16, 17 release the respective associated brakes 20, 21. In alternative embodiments, the parking brake relay valve 27 is not provided, but rather the parking brake is controlled directly via the parking brake valve 26.

A pressure of the compressed air in the first service brake circuit 22 is forwarded, provided by the compressor 3 via the compressed air preparation unit 4 and the pressure vessel 5, in accordance with the position of the foot brake module 6, to the service brake cylinders 14, 15 of the brakes 20, 21 at a rear axle of the utility vehicle 1, in order to activate, in the case of an increase in the pressure, the brakes 20, 21 which are assigned in each case to the spring energy cylinders 16, 17, and to allow the brakes 20, 21 to pass into engagement in accordance with the pressure or, in the case of a reduction in the pressure, to release or to decrease a braking performance. In the second service brake circuit 23, the pressure, provided in an analogous way, of the compressed air is forwarded from the pressure vessel 5' in accordance with the position of the foot brake module 6 to the service brake cylinders 12, 13 of the brakes 18, 19 at a front axle of the utility vehicle 1, in order, in the case of an increase in the pressure, to activate the brakes 18, 19 in accordance of the pressure and to allow the brakes 20, 21 to pass into engagement or, in the case of a reduction in the pressure, to release them or to decrease the braking performance. In alternative embodiments, in each case either only a single brake 18, 19, 20, 21 with a single service brake cylinder 12, 13, 14, 15 is provided in the service brake circuits 22, 23, or more than two brakes 18, 19, 20, 21 and therefore more than two service brake cylinders 12, 13, 14, 15 can be provided.

Furthermore, the brake system 2 has an electronic brake controller unit 28. The brake controller unit 28 is connected to the foot brake module 6, the pressure regulating modules 7, 8 and the 3/3-way valve 11, and, inter alia, controls corresponding pressures in the brake circuits.

The valve which acts as an ABS valve is a 3/3-way valve 11 which is configured as a pressure control valve. In alternative embodiments, the 3/3-way valve 11 does not act as an ABS valve, or is not configured as a pressure control valve, but rather as a pure open/closed valve.

The 3/3-way valve 11 is arranged in the pneumatic line of the parking brake circuit 24 between the parking brake relay valve 27 and the spring brake cylinders 16, 17, and can be actuated by the electronic brake controller unit 28. In the alternative embodiment without the parking brake relay valve 26, the 3/3-way valve 11 is arranged between the parking brake valve 26 and the spring brake cylinders 16, 17. By the 3/3-way valve 11, the pneumatic line between the 3/3-way valve 11 and the spring energy cylinders 16, 17 can be ventilated to a predefined pressure, in order to cause the spring energy cylinders 16, 17 to allow a brake 20, 21 which is assigned to the spring energy cylinders 16, 17 to pass into engagement and to exert a braking performance. In the case of a 3/3-way valve 11 which is not configured as a pressure control valve, the predefined pressure can be an ambient pressure or, in particular if the 3/3-way valve acts as the ABS valve, pressure, for example, which, although it prevents blocking of a wheel of the utility vehicle, nevertheless achieves a sufficient braking performance. A pressure of this type is usually applied in a pulsating manner. To this end, sensors for detecting a wheel rotational speed and an evaluation unit for determining blocking of the wheel are provided in the utility vehicle 1. A signal with regard to blocking or non-blocking is then converted correspondingly by the electronic brake controller unit 28.

Figure 2:
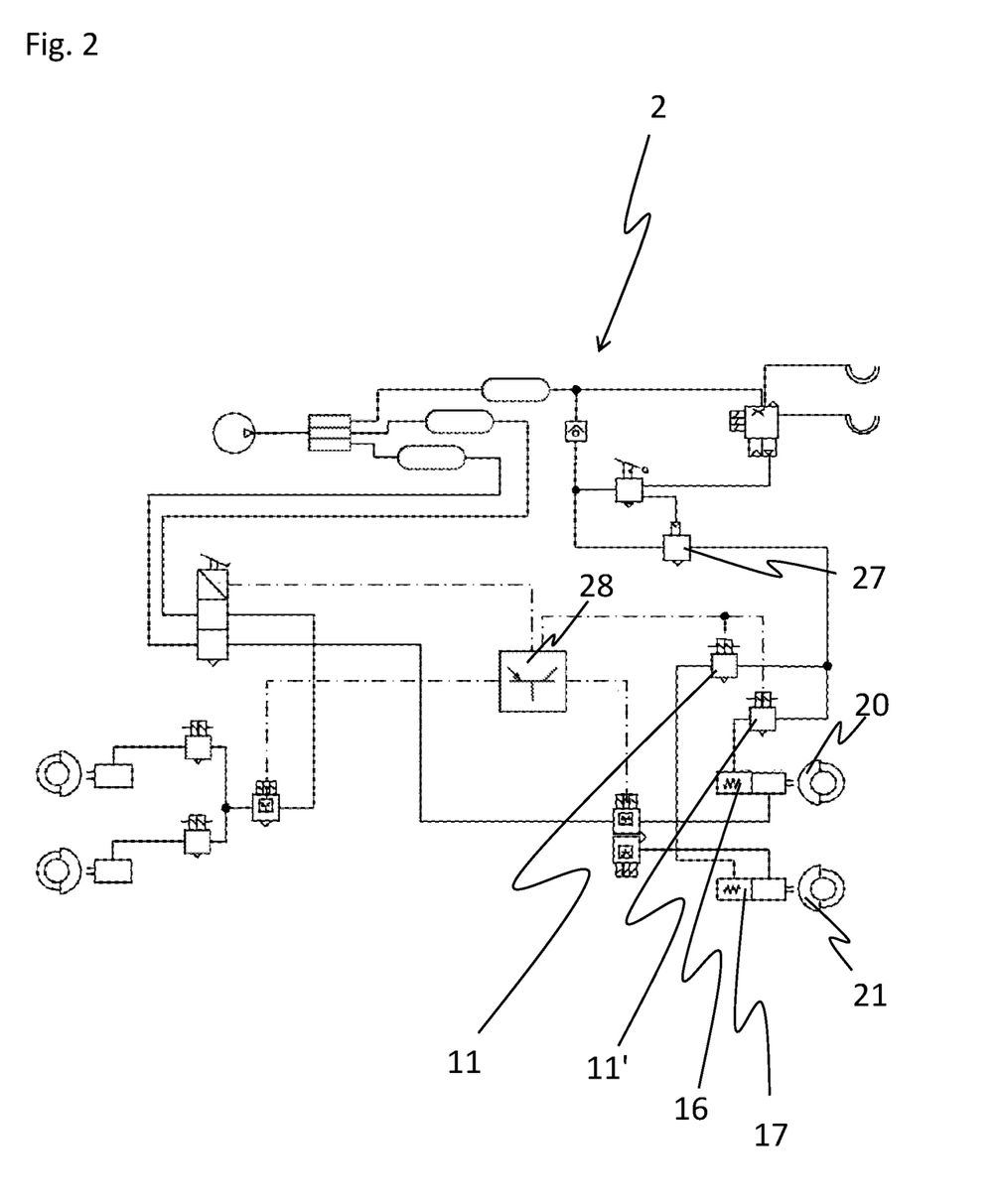
FIG. 2 shows the brake system of the utility vehicle, in accordance with a second embodiment.

FIG. 2 shows the brake system 2 in accordance with a second embodiment. The brake system 2 in accordance with the second embodiment differs from the brake system 2 in accordance with the first embodiment in that, instead of a single 3/3-way valve 11 which is arranged in the pneumatic line between the parking brake relay valve 27 and the spring energy cylinders 16, 17, two 3/3-way valves 11, 11' are provided which are arranged between the parking brake relay valve 27 and in each case one of the spring energy cylinders 16, 17. The 3/3-way valve 11' is also connected to the electronic brake controller unit 28. As a result of the provision of the two 3/3-way valves, the two brakes 20, 21 can be actuated individually and independently of one another.

Figure 3:
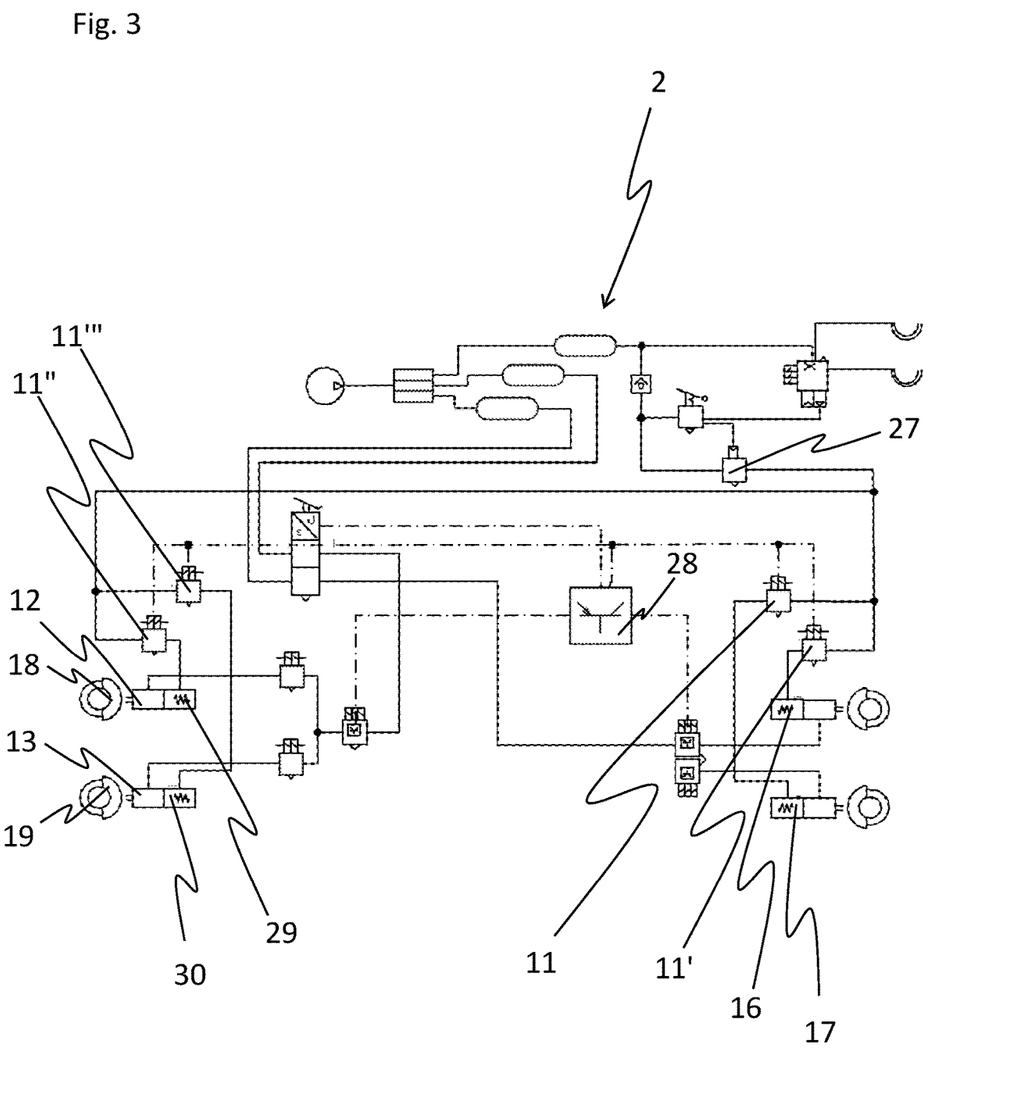
FIG. 3 shows the brake system of the utility vehicle, in accordance with a third embodiment.

FIG. 3 shows the brake system 2 in accordance with a third embodiment. The brake system 2 in accordance with the third embodiment differs from the brake system 2 in accordance with the second embodiment in that spring energy cylinders 29, 30 are also provided at the front axle, namely at the brakes 18, 19. These spring energy cylinders 29, 30 are shown integrally with the service brake cylinders 12, 13 as combined brake cylinders, but can also be separate components as an alternative. In this embodiment, the two 3/3-way valves 11", 11'" are arranged in the pneumatic line in each case between the spring energy cylinders 29, 30 and the parking brake relay valve 27, with the result that a total of four 3/3-way valves 11, 11', 11", 11'" are arranged between the parking brake relay valve 27 and the respective spring energy cylinders 16, 17, 29, 30. The 3/3-way valves 11", 11'" are also connected to the brake controller unit 28, and have the same function as the 3/3-way valves 11, 11' which are described in conjunction with the second embodiment.

Figure 4:
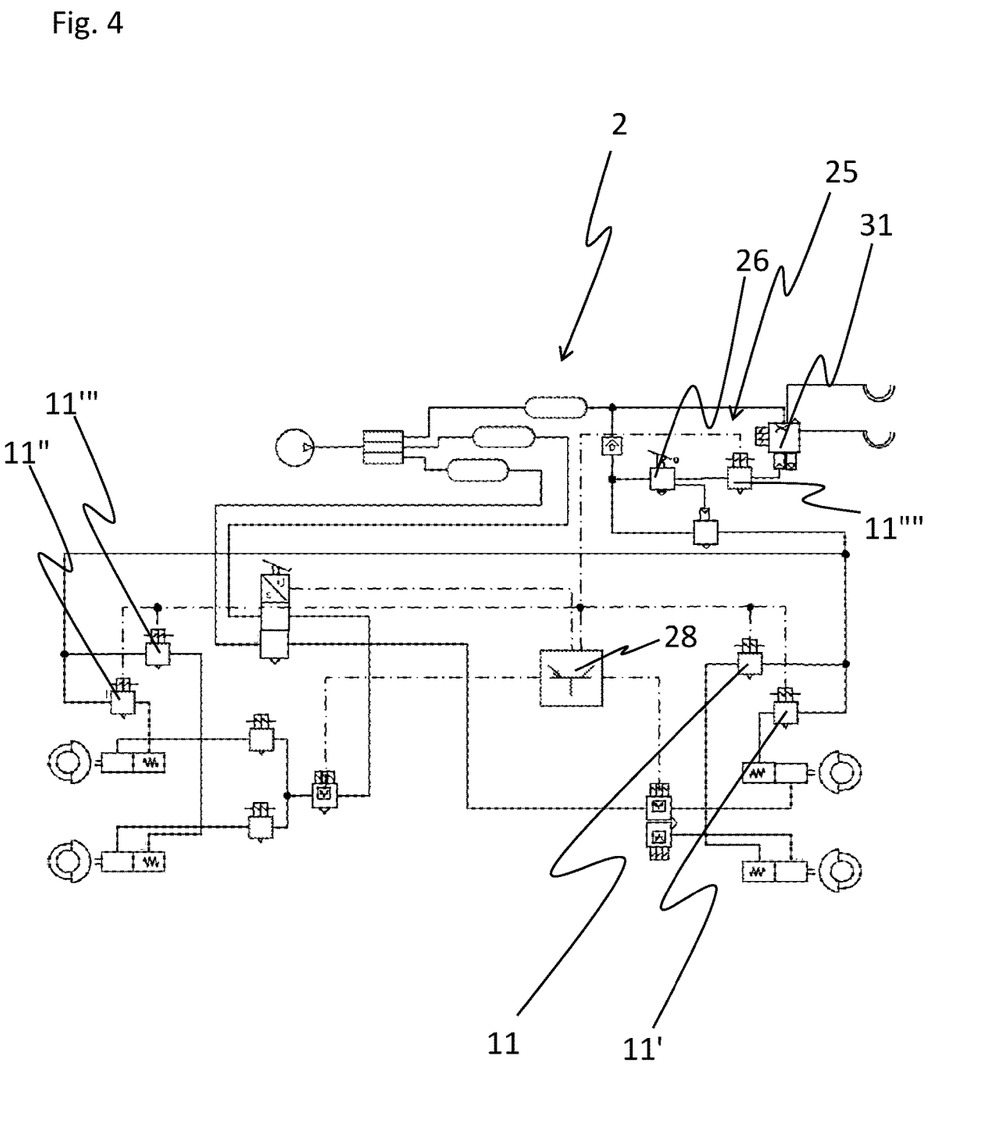
FIG. 4 shows the brake system of the utility vehicle, in accordance with a fourth embodiment.

FIG. 4 shows the brake system 2 in accordance with a fourth embodiment. The brake system 2 in accordance with the fourth embodiment differs from the brake system 2 in accordance with the third embodiment in that a further 3/3-way valve 11"" is provided in the trailer brake circuit 25 between a trailer control valve 33 and the parking brake valve 26. The further 3/3-way valve 11"" is also connected to the brake controller unit 28 and is actuated by the latter.

The function of this further 3/3-way valve 11"" is analogous to that of the 3/3-way valves 11, 11', 11", 11'". In the case of a failure of the trailer brake circuit 25, the further 3/3-way valve 11"" is actuated by the brake controller unit 28 in such a way that the pressure is decreased in the trailer brake circuit 25, that is to say the pneumatic line between the further 3/3-way valve 11"" and the trailer control valve 33 is ventilated to a predefined pressure and, as a result, a trailer spring energy cylinder of the trailer allows the brake which is assigned to it to pass into engagement.

The valve which acts as a further ABS valve is also a further 3/3-way valve 11"" which is configured as a further pressure control valve. In alternative embodiments, the further 3/3-way valve 11"" does not act as a further ABS valve, or is also not configured as a further pressure control valve.

The brake controller unit 28, and therefore its control elements for the 3/3-way valve, is shown as a separate component according to FIGS. 1 to 4. In alternative embodiments, the control elements for the 3/3 way valve can also be integrated into a controller unit of the compressed air preparation device 4, into a controller unit of an electric parking brake, or into a further controller unit.

During operation, the parking brake is released in order to drive the utility vehicle 1. To this end, the parking brake relay valve 27 is actuated by the parking brake valve 26 in such a way that the pressure in the parking brake circuit 25 is increased to such an extent that the spring energy cylinders 16, 17 and possibly the spring energy cylinders 29, 30 and the trailer spring energy cylinder release the respective associated brakes 18, 19, 20, 21.

If a failure of a function of a service brake circuit 22, 23 and possibly of the trailer brake circuit 25 is detected by the brake controller unit 28, the 3/3-way valve or valves 11, 11', 11", 11'" is/are actuated in the case of a brake request by the foot brake module 6, with the result that the pneumatic line between the 3/3-way valve 11, 11', 11", 11'" and the spring energy cylinders 16, 17, 29, 30 is ventilated in each case to a predefined pressure, in order to allow the brakes 12, 13, 14, 15 which are assigned in each case to the spring energy cylinders 16, 17, 29, 30 to pass into engagement. Here, the predefined pressure can be controlled in accordance with the brake request.

Blocking of a wheel of the utility vehicle 1 is possibly detected, and the predefined pressure in the pneumatic line between the 3/3 way valve 11, 11', 11", 11'" is set in such a way that blocking of the wheel is just no longer detected.

If provided, the 3/3-way valve 11"" between the parking brake valve 26 and the trailer control valve 33 is actuated in the case of a failure of the trailer brake circuit 25, and the pneumatic line between the 3/3-way valve 11"" and the trailer control valve 33 is ventilated to a predefined pressure, in order to allow that brake of the trailer which is assigned to the trailer spring energy cylinder to pass into engagement. This takes place by virtue of the fact that an outlet of the trailer control valve 33 is controlled to pressureless or to a predefined pressure.

All of the features which are shown in the description, the following embodiments and the drawing can be essential to the invention both individually and in any desired combination with one another.

THE LIST OF DESIGNATIONS IS AS FOLLOWS

1 Utility vehicle
2 Brake system
3 Compressor
4 Compressed air preparation unit
5, 5', 5" Pressure vessel
6 Foot brake module
7 Pressure regulating valve
8 Pressure regulating valve
9 ABS valve
10 ABS valve
11, 11',
11", 11'",
11"" 3/3-way valve
12 Service brake cylinder
13 Service brake cylinder
14 Service brake cylinder
15 Service brake cylinder
16 Spring energy cylinder
17 Spring energy cylinder
18 Brake
19 Brake
20 Brake
21 Brake
22 First service brake circuit
23 Second service brake circuit
24 Parking brake circuit
25 Trailer brake circuit
26 Parking brake valve
27 Parking brake relay valve
28 Electronic brake controller unit
29 Spring energy cylinder
30 Spring energy cylinder
31 Trailer control valve

What is claimed is:
1. A brake system for a utility vehicle, comprising:
an electronic brake controller unit;
a pneumatic parking brake circuit, including:
at least one spring energy cylinder;

a parking brake valve to control a parking brake pressure in the parking brake circuit; and at least one 3/3-way valve, which is arranged in a pneumatic line of the parking brake circuit, between the parking brake valve and at least one of the spring energy cylinders, wherein the 3/3-way valve is actuable by the electronic brake controller unit;

wherein the 3/3-way valve is configured to ventilate the pneumatic line between the 3/3-way valve and at least one of the spring energy cylinders to a predefined pressure, so as to cause the at least one of the spring energy cylinders to allow a brake, which is assigned to the spring energy cylinder, to pass into engagement;

wherein the electronic control unit is configured to detect a failure of a function of a service brake circuit in the utility vehicle, and based on the detecting of the failure, actuate the at least one 3/3-way valve to ventilate the pneumatic line between the at least one 3/3-way valve and the spring energy cylinder to the predefined pressure, so as to allow the at least one brake which is assigned to the at least one spring energy cylinder to pass into engagement.

2. The brake system of claim 1, wherein the 3/3-way valve includes a pressure control valve.

3. The brake system of claim 1, wherein the 3/3-way valve is formed from two 2/2-way valves.

4. The brake system of claim 1, wherein the 3/3-way valve is configured to be actuable by the electronic brake control unit so that it acts as an ABS valve.

5. The brake system of claim 1, wherein the service brake circuit has at least one service brake cylinder, one of the at least one service brake cylinder being configured to allow the brake, which is assigned to the spring energy cylinder, to pass into engagement.

6. The brake system of claim 5, wherein the service brake cylinder and the spring energy cylinder are configured integrally as a combination brake cylinder.

7. The brake system of claim 5, wherein:
the parking brake circuit have two spring energy cylinders and a single 3/3-way valve,
the brake system have at least two service brake circuits,
one of the service brake circuits have two service brake cylinders, and
the two service brake cylinders are configured to allow the brakes, which are assigned to the two spring energy cylinders, to pass into engagement,
the 3/3-way valve are arranged in the pneumatic line between the parking brake valve and the two spring energy cylinders, and
the 3/3-way valve are configured to cause the two spring energy cylinders to allow the brakes, which are assigned to the two spring energy cylinders, to pass into engagement.

8. The brake system of claim 5, wherein:
the parking brake circuit have two spring energy cylinders and two 3/3-way valves,
the two 3/3-way valves are arranged in the pneumatic line between the parking brake valve and in each case one of the spring energy cylinders,
the brake system have at least two service brake circuits,
one of the service brake circuits have two service brake cylinders,
the two service brake cylinders are configured to allow the brakes, which are assigned to the two spring energy cylinders, to pass into engagement, and
the two 3/3-way valves are configured to cause the two spring energy cylinders in each case to allow the brake, which is assigned to the respective spring energy cylinder, to pass into engagement individually and independently of one another.

9. The brake system of claim 5, wherein:
the parking brake circuit have four spring energy cylinders and four 3/3-way valves,
the four 3/3-way valves are arranged in the pneumatic line between the parking brake valve and in each case one of the spring energy cylinders,
the brake system have at least two service brake circuits,
two of the service brake circuits have in each case two service brake cylinders,
the two service brake cylinders are configured to allow the brakes, which are assigned to the four spring energy cylinders, to pass into engagement, and
the four 3/3-way valves are configured to cause the four spring energy cylinders in each case to allow the brake, which is assigned to the respective spring energy cylinder, to pass into engagement individually and independently of one another.

10. The brake system of claim 1, further comprising:
a trailer control valve to actuate pneumatic brakes of a trailer of the utility vehicle; and
a further 3/3-way valve, which is arranged in a pneumatic line between a parking brake actuating element and the trailer control valve;
wherein the further 3/3-way valve is actuable by the electronic brake control unit, and wherein the further 3/3-way valve is configured to ventilate the pneumatic line between the 3/3-way valve and the trailer control valve to a predefined pressure.

11. The brake system as claimed in claim 10, wherein the further 3/3-way valve includes a further pressure control valve.

12. The brake system as claimed in claim 11, wherein the further pressure control valve is configured to be actuable by the electronic brake controller unit so that it acts as an ABS valve.

13. The brake system of claim 1, wherein the brake system has an air preparation unit, and wherein control units of the electronic brake control unit for the 3/3-way valve are integrated into a control unit of the air preparation unit.

14. The brake system of claim 1, wherein the brake system has an electric parking brake, and wherein control elements of the electronic brake control unit for the 3/3-way valve are integrated into a controller unit of the electric parking brake.

15. The brake system of claim 1, further comprising:
a further controller unit, wherein control elements of the electronic brake controller unit for the 3/3-way valve are integrated into this further controller unit.

16. A utility vehicle, comprising:
a brake system, including:
an electronic brake controller unit;
a pneumatic parking brake circuit, including:
at least one spring energy cylinder;
a parking brake valve to control a parking brake pressure in the parking brake circuit; and
at least one 3/3-way valve, which is arranged in a pneumatic line of the parking brake circuit, between the parking brake valve and at least one of the spring energy cylinders, wherein the 3/3-way valve is actuable by the electronic brake controller unit;
wherein the 3/3-way valve is configured to ventilate the pneumatic line between the 3/3-way valve and at least one of the spring energy cylinders to a predefined pressure, so as to cause the at least one of the spring energy cylinders to allow a brake, which is assigned to the spring energy cylinder, to pass into engagement;
wherein the electronic control unit is configured to detect a failure of a function of a service brake circuit in the utility vehicle, and based on the detecting of the failure, actuate the at least one 3/3-way valve to ventilate the pneumatic line between the at least one 3/3-way valve and the spring energy cylinder to the predefined pressure, so as to allow the at least one brake which is assigned to the at least one spring energy cylinder to pass into engagement.

17. A method for operating a brake system of a utility vehicle, the method comprising:
releasing at least one brake, which is assigned to at least one spring energy cylinder by actuating a parking brake valve and increasing a parking brake pressure in a parking brake circuit, wherein the brake system includes:
an electronic brake controller unit;
a pneumatic parking brake circuit, including:
the at least one spring energy cylinder;
the parking brake valve to control the parking brake pressure in the parking brake circuit; and
at least one 3/3-way valve, which is arranged in a pneumatic line of the parking brake circuit, between the parking brake valve and at least one of the spring energy cylinders, wherein the 3/3-way valve is actuable by the electronic brake controller unit;
wherein the 3/3-way valve is configured to ventilate the pneumatic line between the 3/3-way valve and at least one of the spring energy cylinders to a predefined pressure, so as to cause the at least one of the spring energy cylinders to allow the brake, which is assigned to the spring energy cylinder, to pass into engagement;
detecting, by the electronic brake controller unit, a failure of a function of a service brake circuit of the utility vehicle; and
based on the detecting of the failure of the function of the service brake circuit, actuating, by the electronic brake controller unit, the at least one 3/3-way valve and ventilating of the pneumatic line between the at least one 3/3-way valve and the spring energy cylinder to a predefined pressure, so as to allow the at least one brake which is assigned to the at least one spring energy cylinder to pass into engagement.

18. The method as claimed in claim 17, further comprising:
detecting blocking of a wheel of the utility vehicle; and
setting the predefined pressure in the pneumatic line between the 3/3-way valve and the spring energy cylinder, so that blocking of the wheel is no longer detected.

19. The brake system of claim 10, wherein the electronic control unit is configured to detect a failure of the pneumatic trailer brake circuit, and, based on detecting the failure of the failure of the pneumatic trailer brake circuit, to actuate the further 3/3-way valve to ventilate the pneumatic line between the further 3/3-way valve and the trailer control valve to a predefined pressure, so as to allow that brake of the trailer of the utility vehicle, which is assigned to a trailer spring energy cylinder of the trailer, to pass into engagement.

20. The brake system of claim 1, wherein the failure of the failure of the function of the service brake circuit in the utility vehicle includes a defect in a component of the service brake circuit.

21. The brake system of claim 1, wherein the failure of the failure of the function of the service brake circuit in the utility vehicle includes failure of a pneumatic brake circuit of the service brake circuit.

* * * * *